United States Patent
Nadir et al.

(10) Patent No.: US 11,438,233 B1
(45) Date of Patent: Sep. 6, 2022

(54) SYSTEMS AND METHODS FOR MONITORING AND ENFORCING COLLABORATION CONTROLS ACROSS HETEROGENEOUS COLLABORATION PLATFORMS

(71) Applicant: Theta Lake, Inc., Santa Barbara, CA (US)

(72) Inventors: Daniel O. Nadir, Carlsbad, CA (US); Devin H. Redmond, Encinitas, CA (US); Richard B. Sutton, San Mateo, CA (US); Derek G. Brenner, Lompoc, CA (US)

(73) Assignee: Theta Lake, Inc., Santa Barbara, CA (US)

( * ) Notice: Subject to any disclaimer, the term of this patent is extended or adjusted under 35 U.S.C. 154(b) by 0 days.

(21) Appl. No.: 17/378,481

(22) Filed: Jul. 16, 2021

(51) Int. Cl.
*H04L 41/0866* (2022.01)
*H04L 41/0604* (2022.01)
*H04L 41/0893* (2022.01)
*G06Q 10/10* (2012.01)

(52) U.S. Cl.
CPC ......... *H04L 41/0866* (2013.01); *G06Q 10/10* (2013.01); *H04L 41/0609* (2013.01); *H04L 41/0893* (2013.01)

(58) Field of Classification Search
CPC ..... H04L 41/12; H04L 41/0609; H04L 41/08; H04L 41/0893; H04L 67/34; H04L 41/0866; G06Q 10/10; G06Q 50/01
See application file for complete search history.

(56) References Cited

U.S. PATENT DOCUMENTS

| | | | | |
|---|---|---|---|---|
| 8,234,688 B2 * | 7/2012 | Grandison | ............. | G06Q 50/01 715/741 |
| 9,503,482 B1 * | 11/2016 | Hugenbruch | ......... | H04L 63/105 |
| 2011/0296003 A1 * | 12/2011 | McCann | ................. | H04L 67/22 709/224 |

* cited by examiner

*Primary Examiner* — Tonia L Dollinger
*Assistant Examiner* — Joseph M Cousins
(74) *Attorney, Agent, or Firm* — Sprinkle IP Law Group

(57) ABSTRACT

A data security system collects collaboration platform collaboration settings through interfaces and analyzes those settings against a policy of common collaboration settings for security and compliance. The data security system interfaces with a plurality of heterogeneous online collaboration platforms, each having its own platform specific set of collaboration settings to control access to collaborative data. The data security system maps the set of common collaboration settings to the platform specific set of collaboration settings of each heterogeneous online collaboration platform from the plurality of heterogeneous online collaboration platforms and monitors a state of the platform specific set of collaboration settings of each heterogeneous online collaboration platform. Based on a determination that a platform specific collaboration setting does not comply with the collaboration setting policy, the data security system can take a remedial action or other action.

21 Claims, 10 Drawing Sheets

Realbank Advisor Meetings

| Status | Rule Name | Severity Level | |
|---|---|---|---|
| ✓ OK | Microsoft API is reachable | Risk | ○ |
| ⓘ Info | View your Microsoft Secure Store | Information | ○ |
| ✓ OK | Your selected teams are active | Risk | ○ |
| ✓ OK | Disable user's ability to modify channels | Risk | ○ |
| Disabled | Disable user's ability to modify private channels | | ○ |
| ✓ OK | Disable user's ability to delete channels | Risk | ○ |
| ✓ OK | Disable user's ability to add apps | Risk | ○ |
| ✓ OK | Disable user's ability to modify tabs | Risk | ○ |
| Disabled | Disable user's ability to modify connectors | | ○ |
| ✓ OK | Disable guest's ability to update channels | Risk | ○ |
| ✓ OK | Disable guest's ability to delete channels | Risk | ○ |
| ⓘ Fix | Disable user's ability to edit messages | Risk | ○ |
| ⓘ Fix | Disable user's ability to delete messages | Risk | ○ |
| ✓ OK | Disable team mentions | Risk | ○ |
| ✓ OK | Disable channel mentions | Risk | ○ |

FIG. 2

SYSTEMS AND METHODS FOR MONITORING AND ENFORCING COLLABORATION CONTROLS ACROSS HETEROGENEOUS COLLABORATION PLATFORMS

TECHNICAL FIELD

This disclosure relates generally to computer computer-based collaboration. More particularly, embodiments relate to systems and methods for enforcing security and compliance controls for electronic data and communications across heterogeneous collaboration platforms.

BACKGROUND

With the proliferation of electronic data, the enforcement of data security and compliance policies by computer systems to protect against data theft, unauthorized access, loss, and misuse of confidential digital assets, personally identifiable information, and other sensitive information has become an increasingly important aspect of enterprise computing. In addition, understanding if potentially inappropriate or abusive behavior occurs on enterprise communications is a critical concern. Many enterprises now employ computer-based security systems, to establish and enforce data security and compliance policies for the organization's digital information.

As organizations have rapidly adopted cloud-based and other online collaboration platforms, new security risks particular to data in online collaborations, such as uninvited users joining online video conferences and unauthorized online meeting and chat access, have become more prominent. Modern online collaboration platforms have dozens of collaboration settings that can change, and new settings are constantly added. In modern online collaboration platforms, data related to collaboration settings that pertain to data security, behavior and compliance are set and processed in different ways, using many different formats and many different interfaces. Moreover, different collaboration platforms use very different terminology to describe settings. As more and more online collaboration platforms are employed for sharing and working on data, the lack of data security, compliance and behavior setting consistency between these systems raises significant challenges for policy monitoring and enforcement in enterprise computing environments.

Prior data security systems do not provide recommendations based on policy or business type nor effective monitoring and setting of collaboration settings across heterogeneous online collaboration platforms, nor do they provide a mechanism to develop and manage a common set of collaboration settings across the collaboration platforms used by an organization. Instead, setting, monitoring, and updating of settings across collaboration platforms requires extensive manual intervention, which is highly inefficient and error prone, and often allows settings to be modified by different groups in the organization who do not share the same goals.

In a typical scenario, an IT, security, or compliance staff member must logon to each online collaboration platform through the user interface provided by that platform and individually manage the collaboration settings for that platform. The user interfaces provided by collaboration platforms are often complex and potentially confusing, with the settings unintuitively spread across many locations, requiring the individual to hunt for the settings and have expertise in what each setting does and where it is located, which is different for, and may change for, each online collaboration platform. Due to the number of platforms now being used, the lack of consistency in the platforms, and continual changes to settings, IT, security, and compliance staff may not have expertise in this area and lack clarity on important settings. Settings are often set in a manner that does not comply with the organization's data security and compliance policies and settings that are out of policy are often not discovered until an incident (e.g., security breach, undesirable behavior or another incident) occurs and is recognized, such as when an uninvited user joins a video conference.

As such, there is a need to enhance the performance of computer-based technologies, such as data security systems, by providing the capability to establish and monitor a common set of collaboration settings across heterogeneous online collaboration platforms to proactively detect settings that do not comply with a policy. Further, there is a need to enhance the performance of such computer-based technologies by providing a mechanism to efficiently enforce collaboration settings across heterogeneous online collaboration platforms.

SUMMARY

Attention is thus directed to the system and methods disclosed herein. The present disclosure describes techniques used in systems, methods, and computer program products that embody computerized techniques for enforcing and monitoring collaboration platform controls across heterogeneous online collaboration platforms. A centralized data security system, which may be cloud-based in some embodiments, collects collaboration platform collaboration settings through interfaces, such as application programming interfaces (APIs), and analyzes those settings against a policy of common collaboration settings for security and compliance. According to one embodiment, the centralized data security system displays the status of the collaboration settings for each collaboration platform in a summary view. Further, the data security system can direct users to the detailed view of the specific collaboration settings for each platform. In some embodiments, the data security system automatically enforces and updates collaboration settings to ensure that the best practice settings are continuously enforced.

According to one embodiment, a data security system comprises a memory storing a collaboration setting policy comprising a configuration for a set of common collaboration settings. An embodiment may also include a processor and a computer-readable storage medium. The computer-readable storage medium may store a set of instructions executable by the processor. The instructions may include instructions for interfacing with a plurality of heterogeneous online collaboration platforms, each heterogeneous online collaboration platform from the plurality of heterogeneous online collaboration platforms having a platform-specific set of collaboration settings to control access to the collaboration platform, mapping the set of common collaboration settings to the platform-specific set of collaboration settings of each heterogeneous online collaboration platform from the plurality of heterogeneous online collaboration platforms, monitoring a state of the platform-specific set of collaboration settings of each heterogeneous online collaboration platform, and, based on the monitoring, determining whether a platform specific collaboration setting that maps to a common collaboration setting complies with the collaboration setting policy The set of instructions may further include instructions for performing various steps based on a determination that the collaboration platform specific collaboration setting is out policy, including, for example, storing an indication that a first platform specific collaboration setting does not comply with the collaboration setting policy and automatically generating a link to an application page of a first online collaboration platform from the plurality of heterogeneous online collaboration platforms, the application page including a control to change a state of the first platform specific collaboration setting. The set of instructions may further include instructions for generating a user interface containing the link to allow a user to navigate directly to the application page that includes the control.

According to one embodiment, the data security system generates an aggregated view of policy settings or potential policy issues with respect to the collaboration setting policy. The aggregated view aggregates potential policy issues, collaboration rules, or collaboration settings across the plurality of heterogeneous online collaboration platforms.

According to another embodiment, the data security system provides a user interface indicating a status of each of the common collaboration settings from the set of common collaboration settings, the status for each common collaboration setting indicating whether mapped settings on the plurality of heterogeneous online collaboration platforms match the collaboration setting policy.

According to one embodiment, each of the common collaboration settings from the set of common collaboration settings has an associated severity level. The severity level may be used to control what actions result when a platform specific collaboration setting does not comply with a corresponding common collaboration setting. An action may include, for example, generating an alert or notification that a platform specific collaboration setting does not comply with the corresponding common collaboration setting, reverting a change to the platform-specific collaboration setting or taking another remedial action with respect to the setting, or taking another action defined for the severity level and setting.

According to one embodiment, the data security system includes a unified user interface with a set of controls to allow the user to configure the collaboration setting policy. In some embodiments, the data security system can automatically propagate changes made to the policy to the online collaboration platforms.

The common set of collaboration settings may include a variety of settings, such as, but not limited to a setting to enable waiting rooms, a setting to require meeting passwords, a setting to enable encryption, a setting to integrate an application, a setting to prohibit content deletion, or a setting to enable an end-user control.

The disclosed embodiments improve over legacy approaches. In particular, embodiments allow out of policy collaboration settings to be pro-actively detected across heterogeneous online collaboration platforms, preventing or reducing security incidents. Further, embodiments can directly link to non-compliant settings at the heterogeneous online collaboration platforms, making the process of updating collaboration settings more efficient. Some embodiments can automatically enforce and update collaboration settings.

Embodiments allow a set of collaboration setting best practices to be developed, aggregate collaboration settings in a central location, and allow for updating or enforcement of those settings in a unified manner.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 illustrates one embodiment of an administrator user interface for specifying the common collaboration settings for a collaboration setting policy.

DETAILED DESCRIPTION

Figure 1:
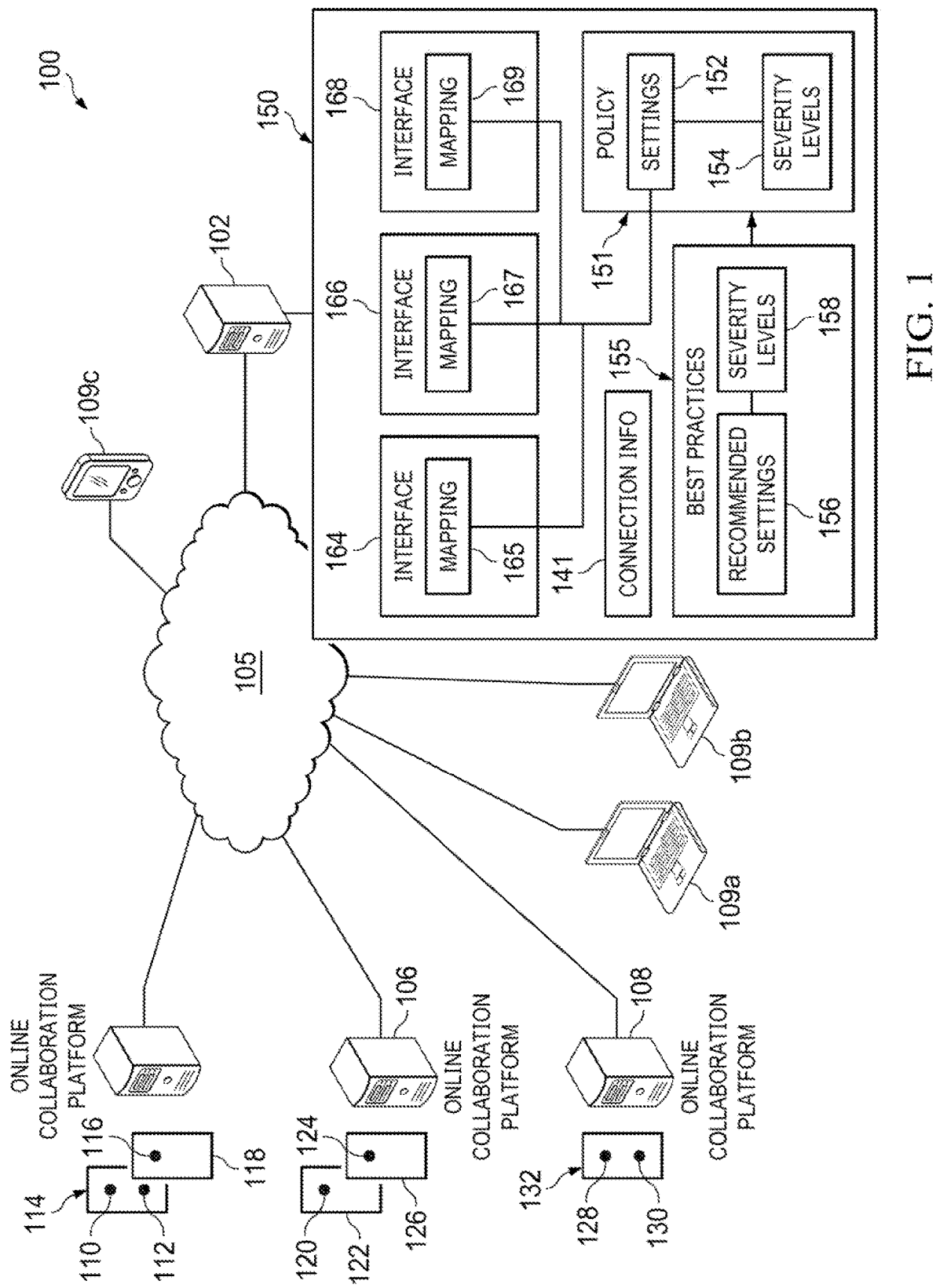
FIG. 1 is a diagrammatic representation of one embodiment of a computing ecosystem that comprises a data security platform for automatic policy-based detection of risks across heterogeneous online collaboration platforms.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. Many computing ecosystems now utilize multiple different and independently administered online collaboration platforms, involving different configurations, data formats, and collaboration settings that control access to collaborations, data shared during collaborations, and behaviors with respect to collaborations. Such collaboration settings include, for example, settings that govern who can participate in a collaboration, how a collaboration controls entry of participants, actions that users can take with respect to content of a collaboration, which applications can integrate with a collaboration or the like. The volume of and heterogeneous characteristics of collaboration settings across online collaboration platforms presents challenges for technologies related to computer security, and in particular to enabling, monitoring and enforcement of data security and compliance policies.

Embodiments described herein provide computer-based technologies to establish and monitor a common set of collaboration settings across heterogeneous online collaboration platforms. A data security system or other computer system collects collaboration platform settings through interfaces, analyzes those settings against a policy designed for optimal security and compliance, and displays the status of the settings for each collaboration platform in, for example, a summary view. The data security system can also facilitate the efficient enforcement of those settings by providing direct access from a unified interface to the corresponding settings at the heterogeneous collaboration platforms. Some embodiments also facilitate the efficient enforcement of those settings by automatically changing settings across the heterogeneous online collaboration platforms to comply with the common settings. For example, where the collaboration platform interfaces allow, the data security system will automatically enforce and update collaboration settings to ensure that the policy settings are continuously enforced. Embodiments can thus enable a set of best practice settings for optimal security and compliance to be established to protect the organization against unauthorized meeting access and other undesired incidents that can occur in online collaboration environments, provide a unified view into important settings across collaboration platforms, monitor for changes to those settings, report on the changes and automatically revert the changes where possible.

FIG. 1 is a diagrammatic representation of one embodiment of a computing ecosystem 100 that comprises a data security platform 102 connected to heterogeneous online collaboration platforms (online collaboration platform 104, online collaboration platform 106, online collaboration platform 108) and client computers (e.g., client 109a, client 109b, client 109c) via network 105. In one embodiment, the data security platform 102 is a cloud-based system that provides automatic policy-based detection of collaboration settings that are out of policy across heterogeneous online collaboration platforms for multiple organizations according to each organization's policies. Various clients (e.g., client 109a, client 109b, client 109c) may be used by users to configure collaboration settings at the data security platform 102 or the online collaboration platforms or perform other administrative functions or other types of functions with respect to the data security platform 102 and the online collaboration platforms.

According to one embodiment, the heterogeneous online collaboration platforms are cloud-based collaboration platforms or other types of online collaboration platforms that operate independently to provide collaboration services to allow users to work together digitally online, such as by providing online video conferencing or meetings or other collaboration tools. An organization may use any number of independent online collaboration services (e.g., independently owned or operated by different parties). In some cases, an organization's employees or other agents may share through the online collaboration services data that is subject to the data security and compliance requirements of the organization. However, each of the heterogeneous online collaboration platforms has its own particular set of collaboration settings and organization of and terminology for those settings, and each may use its own data format and interfaces for managing those settings, making it challenging to manage data security across the heterogeneous online collaboration platforms.

An entity (e.g., an account holder, such as an organization, or other entity) may have accounts on various online collaboration platforms and have an associated configuration at each online collaboration platform. The entity's configuration on a particular online collaboration platform can include collaboration settings associated with and configured by the entity, including collaboration settings that pertain to the entity as a whole—that is, collaboration settings that apply to all collaborations under that entity at the online collaboration platform—and collaboration settings that apply to particular collaborations (e.g., meeting-specific settings), logical groupings of users (e.g., teams, groups), and individual users under the entity on the collaboration platform.

As mentioned, each online collaboration platform may provide a different set of collaboration settings. The configuration for an entity at an online collaboration platform may have any number of settings accessible at any number of locations and the number of settings and locations depicted are simply for the purposes of illustration. In the depicted embodiment, for example, the configuration for hypothetical entity RealBank at online collaboration platform 104 may include a collaboration setting 110 and a second collaboration setting 112 configurable at first location 114 (e.g., a first application page as represented by a link, such as a URL) associated with online collaboration platform 104 and a third collaboration setting 116 accessible at a second location 118 associated with online collaboration platform 104. Similarly, in the depicted embodiment, the configuration for hypothetical entity RealBank at online collaboration platform may have a collaboration setting 120 configurable at a first location 122 associated with the online collaboration platform 106 and a collaboration setting 124 configurable at a second location 126 associated with the online collaboration platform 106. The configuration for hypothetical entity RealBank at online collaboration platform 108 may have collaboration settings 128, 130 configurable at location 132 associated with the online collaboration platform 106.

From the standpoint of achieving a particular data compliance and security goal, different collaboration settings and, in some cases, a different number of settings, may have to be set at each online collaboration platform to achieve that goal. As mentioned, the lack of collaboration setting consistency between these systems raises significant challenges for policy monitoring and enforcement in enterprise computing environments.

The security platform 102 includes a data security application 150 that monitors and enforces collaboration settings for an entity across the heterogeneous online collaboration platforms. As part of onboarding an online collaboration platform for an entity at the data security platform 102, a user with sufficient administrative privileges connects data security platform 102 to the entity's account at the online collaboration platform and adds data security platform 102 as user for the entity with sufficient privileges to collect or edit collaboration settings associated with the entity's account at the online collaboration platform. In some cases, this is a long-term connection. Data security platform 102 may thus maintain connection data 141 associated with an entity (e.g., organization or other account holder at data security platform), such as information used to authenticate with the online collaboration platforms as a user with sufficient privileges to collect or edit the collaboration settings for the entity or other information to connect to the online collaboration platforms. As discussed below, in some cases, an account holder at data security platform 102 may have multiple groups or collaborations at an online collaboration platform. In some embodiments, the information for an account holder at data security platform 102 may include information used to collect collaboration settings or set collaboration settings for the various groups/collaborations.

The data security platform 102 provides a common set of collaboration settings, interfaces to the heterogeneous online collaboration platforms, and mappings from the common set of collaboration settings to the platform specific collaboration settings of the heterogeneous online collaboration platforms. According to one embodiment, the collaboration settings provided by data security platform 102 enable or disable various rules. Examples of collaboration settings include, but are not limited to, settings to enable/disable waiting rooms, require/not require meeting passwords, enable/disable encryption, data security platform integration active/inactive, content deletion allowed/prohibited, enable/disable end-user controls, disable end-user controls. Other non-limiting examples are depicted in FIG. 2.

An entity (such as an organization or other account holder defined at data security platform 102) having accounts at the heterogeneous online collaboration platforms can establish a collaboration setting policy (e.g., policy) that comprises a set of common collaboration settings 152 configured for the entity by a user with sufficient privileges at data security platform 102 to do so. The common collaboration settings 152 of a collaboration setting policy 151 map to online collaboration platform specific settings that govern who can participate in a collaboration, how a collaboration controls entry of participants, actions that users can take with respect to content of a collaboration, which applications can integrate with a collaboration or the like. In some embodiments, the common collaboration settings 152 may include recommended settings (e.g., adopted from recommended settings 156). A common collaboration setting may map to the platform specific collaboration settings of multiple collaboration platforms. A collaboration setting policy may also include collaboration settings that map to a single online collaboration platform—for example, if the setting corresponds to functionality provided by a single platform and similar functionality is not provided by the other collaboration platforms.

An entity (e.g., organization or other account holder at data security platform 102) may have more than one collaboration setting policy at data security platform 102 may implement collaboration setting policies for multiple entities. The data security platform 102 monitors the state of collaboration settings of the online collaboration platforms and facilitates enforcement of the collaboration setting policies. In some embodiments, the data security platform 102 provides a unified graphical user interface that provides direct access to out of policy settings at the heterogeneous online collaboration platforms. In addition, or in the alternative, the data security platform 102 automatically changes settings across the heterogeneous online collaboration platforms to comply with the safety configuration and validation report policies.

In some embodiments, the collaboration settings 152 of a collaboration setting policy 151 are assigned severity levels 154 which govern notification, alert, reporting, reversion, or other actions when the collaboration settings at an online collaboration platform do not comply with the policy. In other embodiments, the severity levels are assigned as part of the definition of the collaboration settings and are the same across all collaboration setting policies. In yet other embodiments, severity levels are assigned to collaboration settings on an entity (e.g., organization or other account holder) basis such that a collaboration setting is assigned the same severity level for all collaboration setting policies for the entity. In yet another embodiment, severity levels can be assigned to collaboration settings on a policy-by-policy basis. There may be any number of tiers of severity levels.

According to one embodiment, data security platform 102 is configured with a set of best practices 155 that includes recommended collaboration settings 156 recommended by the provider of data security platform 102. In some embodiments, various sets of best practices (e.g., rule sets) may be defined for various business types. The set of recommended collaboration settings 156, according to one embodiment, enable or disable various rules. The recommended collaboration settings 156 can include rules that map to all of the heterogeneous online collaboration platforms or rules that map to some subset of the heterogeneous online collaboration platforms—for example, a rule may map to a subset of the online collaboration platforms if the rule is with respect to functionality provided by the subset of platforms and similar functionality is not provided by the other collaboration platforms. In some cases, the recommended collaboration settings 156 may also include settings that map to a single online collaboration platform. The recommended settings 156 may be assigned recommended severity levels 158. Creating a collaboration setting policy (collaboration setting policy 152) may thus include selecting whether to accept the recommended collaboration settings 156 (e.g., selecting which recommended rules to enable or disable). Creating a collaboration setting policy (collaboration setting policy 152) may also include accepting or changing recommended severity levels.

In addition, or in the alternative, to data security platform 102 providing best practices defined by the data security platform provider, some embodiments may include entity-specific custom rules and collaboration settings provided or created for an entity (e.g., an organization or other account holder). Creating a collaboration setting policy (collaboration setting policy 152) may thus include selecting whether to accept an entity-specific collaboration setting (e.g., selecting which recommended rules to enable or disable) from the recommended settings specified for an entity. Creating a collaboration setting policy (collaboration setting policy 152) may also include accepting or changing recommended severity levels.

The data security platform 102 interfaces with the various online collaboration platforms through any number of interfaces (e.g., application programming interface (API) 164 to interface with online collaboration platform 104, API 166 to interface with online collaboration platform 106 and API 168 to interface with online collaboration platform 108). According to one embodiment, the interfaces map the collaboration settings from the collaboration setting policies to the various settings that can be configured on the online collaboration platforms. To this end, API 164 includes mapping rules 165 to map collaboration settings defined at data security platform 102 to the various platform specific collaboration settings that can be configured on online collaboration platform 104, API 166 includes mapping rules 167 to map collaboration settings defined at data security platform 102 to the various platform specific collaboration settings that can be configured on online collaboration platform 106, and API 168 includes mapping rules 169 to map collaboration settings defined at data security platform 102 to the various platform specific collaboration settings that can be configured on online collaboration platform 108.

The respective APIs map, for example, the common collaboration settings from the collaboration policy 151 for the entity to the collaboration settings for that entity at the online collaboration platforms. The APIs may also map the collaboration settings from the collaboration setting policy 151 to specific links to the collaboration settings for that entity at the online collaboration platforms.

Turning briefly to FIG. 2, one embodiment of a user interface 200 for specifying the common collaboration settings for a collaboration setting policy is depicted. In the embodiment of FIG. 2, the policy is configured for a hypothetical organization RealBank and is assigned the arbitrary name Realbank Advisors Meetings.

The data security platform 102 (see, FIG. 1) defines a set of common collaboration settings and allows the user to configure the settings, such as to enable or disable the collaboration settings, provide values for the settings, or otherwise set the settings, in the collaboration setting policy via the user interface 200. According to one embodiment, data security platform 102 defines a set of best practices that includes recommended collaboration settings. User interface 200 may present these recommended collaboration settings to the user to allow the user to select which settings to enable or disable—in other words, which recommended rules to enable or disable.

The state of collaboration settings as specified in a collaboration setting policy can be considered a common security configuration for an entity. In the example of FIG. 2, an enabled collaboration setting means that a corresponding security rule applies for that policy is enabled and a disabled collaboration setting means that the corresponding security rule is disabled for that policy. For example, common collaboration setting 202 is enabled such that the rule "disable user's ability to edit messages," which presents a risk because users could potentially delete information, is enabled. Common collaboration setting 202 corresponds to the data security and compliance goal of preventing collaborators from editing messages at the online collaboration platforms. In this example, the rule is expressed with the indication "! Fix", indicating that a corresponding collaboration platform specific collaboration setting to which collaboration setting 202 is mapped is out of policy (i.e., does not comply with the rule), which presents a risk because users can potentially edit information at the collaboration platform.

In some embodiments, when a collaboration setting is disabled in a configuration setting policy, the data security platform does not monitor the heterogeneous collaboration platforms with respect to that rule for that collaboration policies. For example, in such an embodiment, the data security platform does not monitor the state of collaboration platform specific collaboration settings corresponding to collaboration setting 204 because collaboration setting 204 is disabled. In other embodiments, when a common collaboration setting is disabled (such as collaboration setting 204), the data security platform monitors the state of collaboration platform specific collaboration settings corresponding to collaboration setting 204 to determine if they correspond to a disabled state.

The administrator can change the state of this setting by toggling control 204 to disable the setting. If available through the API of an online collaboration platform, the data security platform 102 can automatically update platform-specific collaboration settings at the online collaboration platforms as the settings are changed via user interface 200.

In accordance with one embodiment, one or more common collaboration settings of a collaboration setting policy may be associated with a severity level. In the example provided, the severity levels "information" and "risk" may be assigned. The severity level governs handling of out of policy settings at the heterogeneous online collaboration platforms. For example, the severity level may govern which actions (e.g., alerts, notifications, reversion of changes) occur when a collaboration setting is out of policy. A collaboration setting that is designated as informational may result in different user options than collaboration setting with a severity setting designated as risk.

Figure 3A:
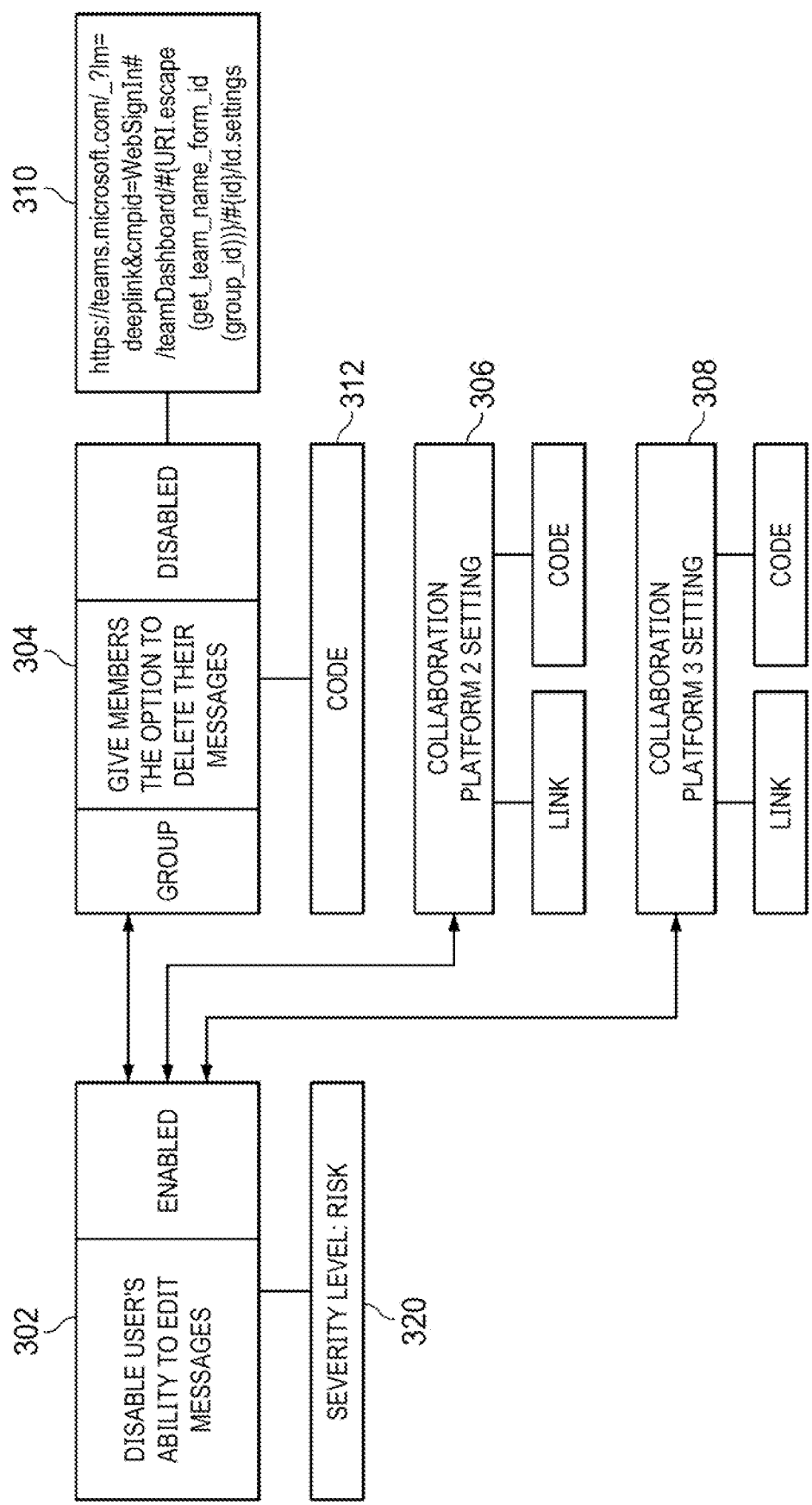
FIG. 3A illustrates one embodiment of mapping a common collaboration setting to an online collaboration platform specific collaboration setting.

FIG. 3A is a block diagram illustrating one embodiment of mapping a common collaboration setting 302 to platform specific collaboration settings that can be configured on the online collaboration platforms. In this embodiment, the common collaboration setting 302 is mapped to the platform specific collaboration settings for three online collaboration platforms (e.g., collaboration platform 1 collaboration setting 304, collaboration platform 2 collaboration setting 306, collaboration platform 3 collaboration setting 308). The first online collaboration platform, for example, has a collaboration 304 setting "Give members the option to delete their messages" that can be enabled or disabled on a per "group" basis, where a group represents a group of collaborators. The common collaboration setting 302 "disable user's ability to edit messages" for an entity thus mapped to the platform specific collaboration setting 304 More particularly, the state for the common collaboration setting 302 can be mapped to a corresponding state for the collaboration platform specific collaboration setting 304. For example, "enabled" for the common collaboration setting 302 may be mapped to "disabled" for platform specific collaboration setting 304. In other words, in order to comply with the common collaboration setting configuration of "disable user's ability to edit messages"=enabled, the platform specific collaboration setting should be "Give members the option to delete their messages"=disabled.

The common collaboration setting 302 and corresponding state may be mapped to a different collaboration platform specific setting 306 and state for a second online collaboration platform and yet another collaboration platform specific setting 308 and state for the third online collaboration platform.

FIG. 3A further illustrates that data security platform 102 may maintain link information 310 associated with common collaboration setting 302. Link information 310 includes information for generating links to the location for setting the platform specific collaboration setting 304 for each group. This example uses the link format of the MICROSOFT TEAMS collaboration platform (all trademarks or trade names used herein are used by way of example and are the property of the respective owners). As will be appreciated by those in the art, the collaboration platform can be queried for a channel id and group id, which can be used to determine a team name for populating the link to the location for configuring the platform specific collaboration setting for a particular team. In some embodiments, a common collaboration setting 302 may also be associated with code 312 executable to automatically enforce a collaboration setting (e.g., to change the state of a corresponding platform specific collaboration setting).

Also as illustrated, the common collaboration settings can have assigned severity levels. For example, the common collaboration setting 302 has an associated severity level 320 of "risk."

Figure 3B:
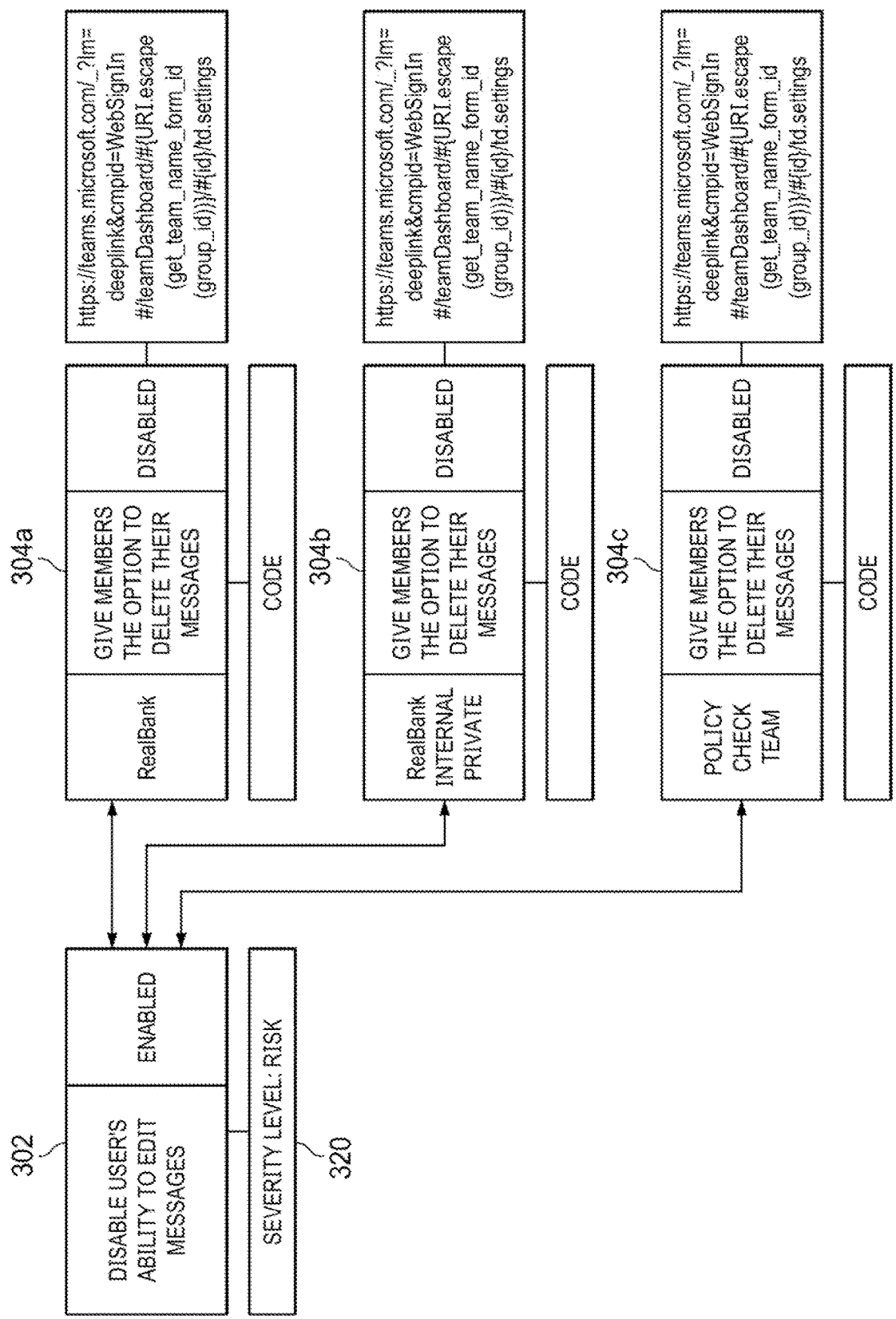
FIG. 3B further illustrates one embodiment of mapping a common security to an online collaboration platform specific collaboration setting.

As described above, common collaboration setting 302 may map to the platform specific collaboration setting 304 that is set on a per group basis. In FIG. 3B, for example, say collaboration setting 302 is set for the hypothetical entity RealBank and RealBank has a "RealBank" group, a "RealBank Internal Private" group, and a "Policy check team" defined at collaboration platform 1, then collaboration setting 302 can mapped to the collaboration platform specific setting 304a for the group RealBank, the collaboration platform specific setting 304b for the group RealBank Internal Private, and the collaboration platform specific setting 304c for the group Policy check team. That is, common collaboration setting 302 "disable user's ability to edit messages" may be mapped to the setting "Give members the option to delete their messages" for the RealBank group (collaboration setting 304a), the setting "Give members the option to delete their messages" for the RealBank Internal Private group (collaboration setting 304b) and the setting "Give members the option to delete their messages" for the Policy check team group (collaboration setting 304c).

Figure 4:
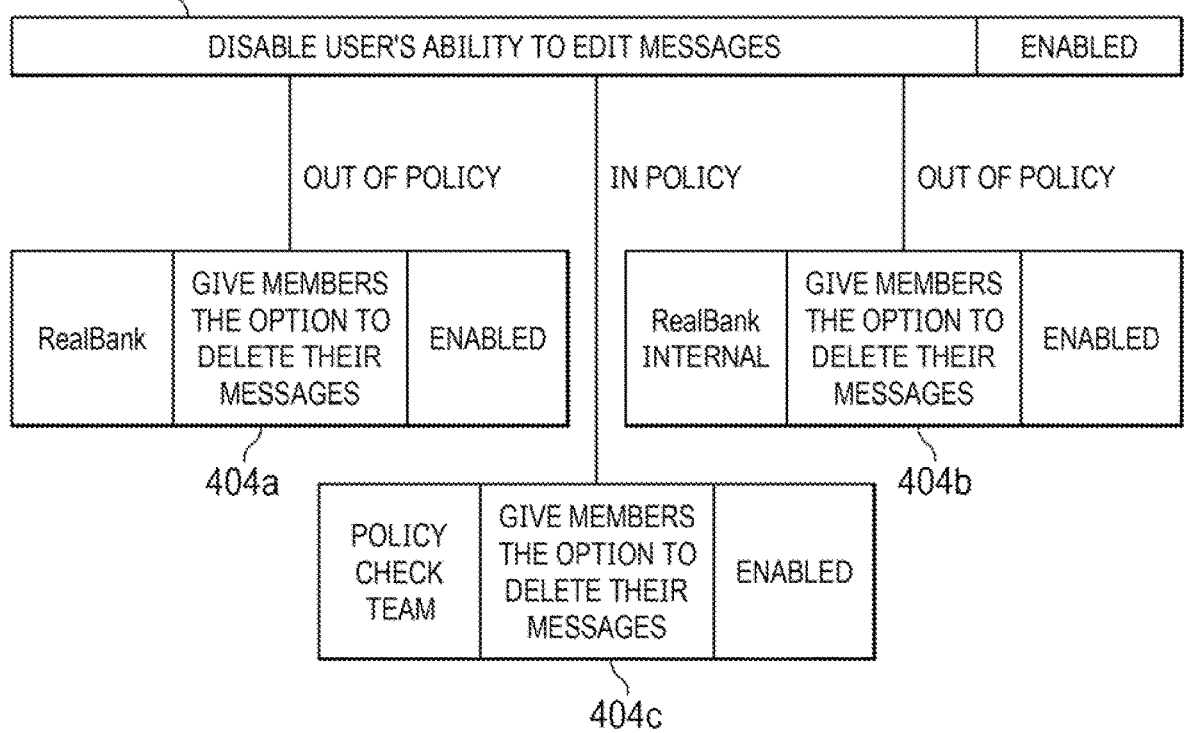
FIG. 4 is a diagrammatic representation of receiving compliant and non-compliant platform specific collaboration settings during monitoring.

Turning to FIG. 4, during monitoring, the data security platform 102 can query the first online collaboration platform for the state of the platform specific collaboration settings that map to a common collaboration setting. For example, if common collaboration setting 402 and its state are mapped as discussed above with respect to FIG. 3A and FIG. 3B, and using the example in which RealBank has a RealBank group, a RealBank Internal Private group, and a Policy check team group, the data security platform 102 queries the appropriate online collaboration platform for the state of the collaboration setting "Give members the option to delete their messages" as set for the RealBank group (e.g., collaboration setting state 404a), the collaboration setting "Give members the option to delete their messages" as set for the RealBank Internal Private group (e.g., collaboration setting state 404b) and the setting "Give members the option to delete their messages" as set for the Policy check team group (e.g., collaboration setting state 404c). In this example, "Give members the option to delete their messages" is set to "enabled" for the RealBank group and the RealBank Internal Private group. The state of the collaboration settings for RealBank group and the RealBank Internal Private group do not comply with the policy in which "disable user's ability to edit messages"=enabled (e.g., as illustrated by common collaboration setting 202 of FIG. 2) because "disable user's ability to edit messages"=enabled maps to "Give members the option to delete their messages"=disabled. As such, the appropriate action based on the corresponding severity level 320 can be executed. On the other hand, the collaboration setting 404c may be considered to be in policy because its state matches the state of corresponding common collaboration setting state 402 according to the mapping.

Figure 5:
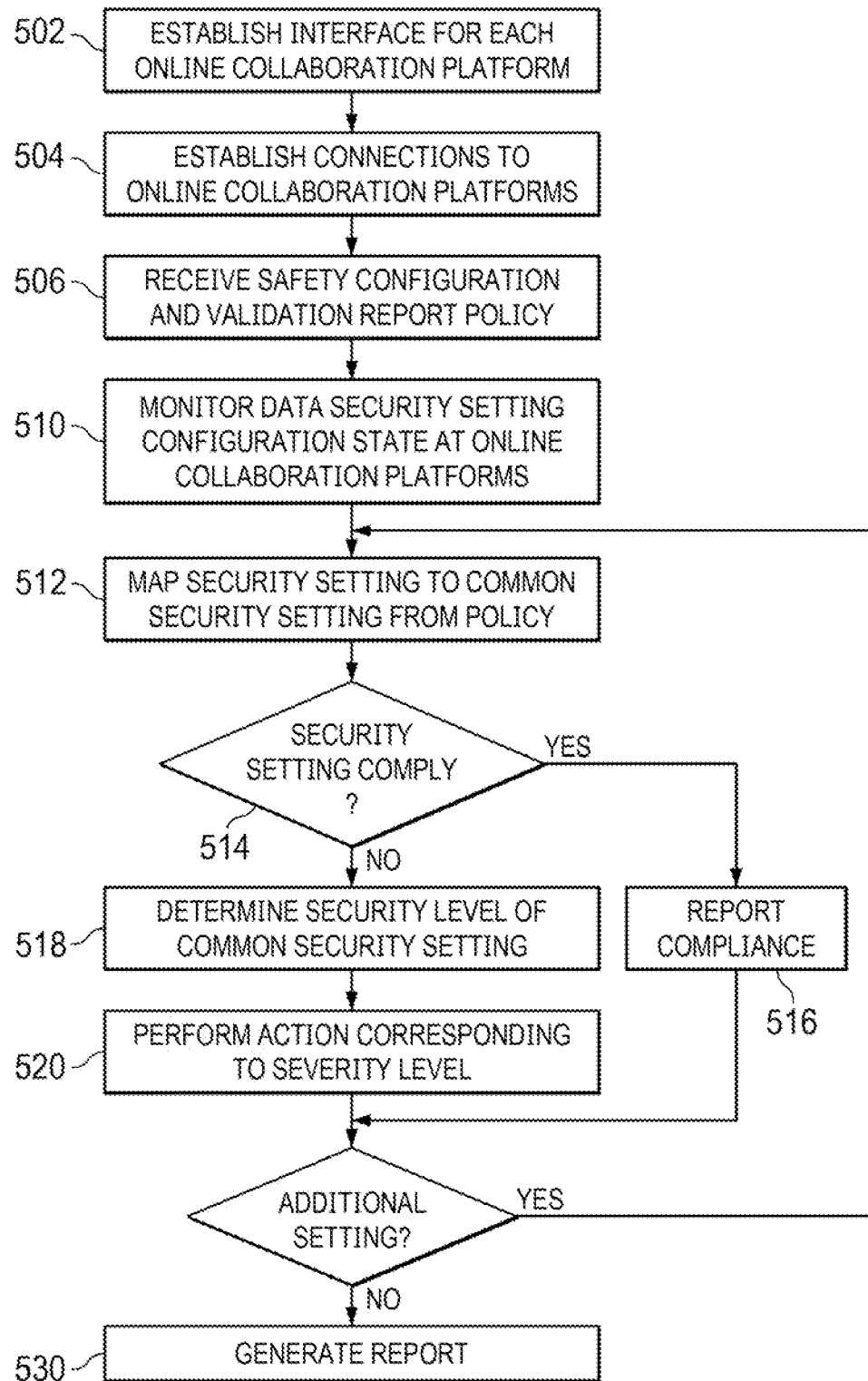
FIG. 5 is a flow chart illustrating one embodiment of a method for monitoring and enforcing collaboration settings across heterogeneous online collaboration platforms.

FIG. 5 is a flow chart illustrating one embodiment of a method for monitoring and enforcing collaboration settings across heterogeneous online collaboration platforms. During setup, an interface can be established for each online collaboration portal (step 502). In particular, mappings between collaboration settings to the various platform specific collaboration settings that can be configured on the online collaboration platforms may be established. In some embodiments, this may include mapping the possible states for the common collaboration settings to the possible states for the corresponding platform specific collaboration settings. In some embodiments, the mappings may be embodied in APIs or other interfaces via which the data security platform 102 collects collaboration settings from the online collaboration platforms or otherwise interacts with the online collaboration platforms. In addition, a connection can be established to each online collaboration platform (step 504). For example, a user with sufficient admin privileges connects data security platform 102 to an entity's accounts at the online collaboration platforms and adds data security platform 102 as user for the entity, with sufficient privileges to collect or edit the collaboration settings associated with the entity.

The data security platform 102 can receive a collaboration setting policy for the entity (step 506) specifying a set of common collaboration settings. In one embodiment, a user may select to enable or disable rules that represent best practices recommended by data security platform provider, rules provided by the account holder, or other rules or a combination thereof.

A set of ongoing operations can be performed with respect to monitoring and enforcing collaboration settings across the heterogeneous online platforms. The data security platform 102 monitors the online collaboration platforms (step 510) for the state of collaboration settings associated with the entity (i.e., the entity for which the policy was established at step 506). The monitoring (step 510) may occur on a predetermined schedule (e.g., every x seconds) or in response to specific events. If a user changes a collaboration setting directly on an online collaboration platform such that the collaboration settings do not comply with the safety configuration and validation report policy, this change will be actively detected by the monitoring.

Data security platform 102, at step 510, queries each online collaboration platform for which mappings to the common collaborations settings have been established for the platform specific collaboration settings associated with the entity. In one embodiment, data security platform 102 accesses the collaboration setting policy and only requests the platform specific collaboration settings that correspond to the enabled collaboration settings in the collaboration setting policy. Thus, when monitoring the online collaboration platforms for the state of collaboration settings, data security platform 102 monitors the online collaboration platforms for the collaboration settings that correspond to the enabled settings—in other words, the enabled rules—specified in a collaboration setting policy, but not the disabled rules. Using the example of FIG. 2, in such an embodiment, the data security platform 102 would not query the online security platforms for the collaboration settings for RealBank that map to "disable user's ability to modify connectors," because that setting is disabled in the collaboration policy. In other embodiments, the data security platform 102 does query the online security platforms for the collaboration settings for the corresponding settings even if the common collaboration setting is disabled in the collaboration setting policy.

The data security platform 102 compares the platform specific settings to the common collaboration settings from the collaboration setting policy to determine if the platform specific settings comply with the collaboration setting policy. According to one embodiment, the data security platform 102 maps between the configuration of the common collaboration settings according to the policy and the configuration of the platform specific collaboration settings (step 512) and determines if the platform specific collaboration settings are in policy or out of policy. More particularly, at step 514, data security platform 102 compares the state of the platform specific collaboration settings matches the state for the corresponding common collaboration settings specified by the policy to determine if the platform specific collaborations settings comply with the collaboration setting policy (step 514). The determination can be performed for each collaboration platform specific collaboration setting retrieved with respect to collaboration setting policy.

In one embodiment, if all the platform specific collaboration settings that correspond to a common collaboration setting in the collaboration setting policy comply with the common collaboration setting, the data security platform 102 can mark that the common collaboration setting is being complied with or otherwise report that the corresponding collaboration platform collaboration settings are in policy (step 516).

If a platform specific collaboration setting does not match the corresponding common collaboration setting, the data security platform 102 may take a specified action to address the collaboration setting that is out of policy. In one embodiment, the action executed by data security platform 102 is based on the severity level associated with the common collaboration setting. In one embodiment, the data security platform 102 determines the severity level associated with the common collaboration setting (step 518) and executes an action based on the severity level (step 520). Examples of actions include, but are not limited to, generating an alert or a notification that a collaboration setting is out of policy, generating a link directly to a control to fix the non-compliant setting (for example, using link information, such as link information 310), displaying the link, executing code to automatically fix the out of policy setting or taking another specified action. In some embodiments, the data security platform 102 can generate a report in a unified interface summarizing out of policy collaboration settings across the heterogeneous collaboration platforms (step 530).

Figure 6:
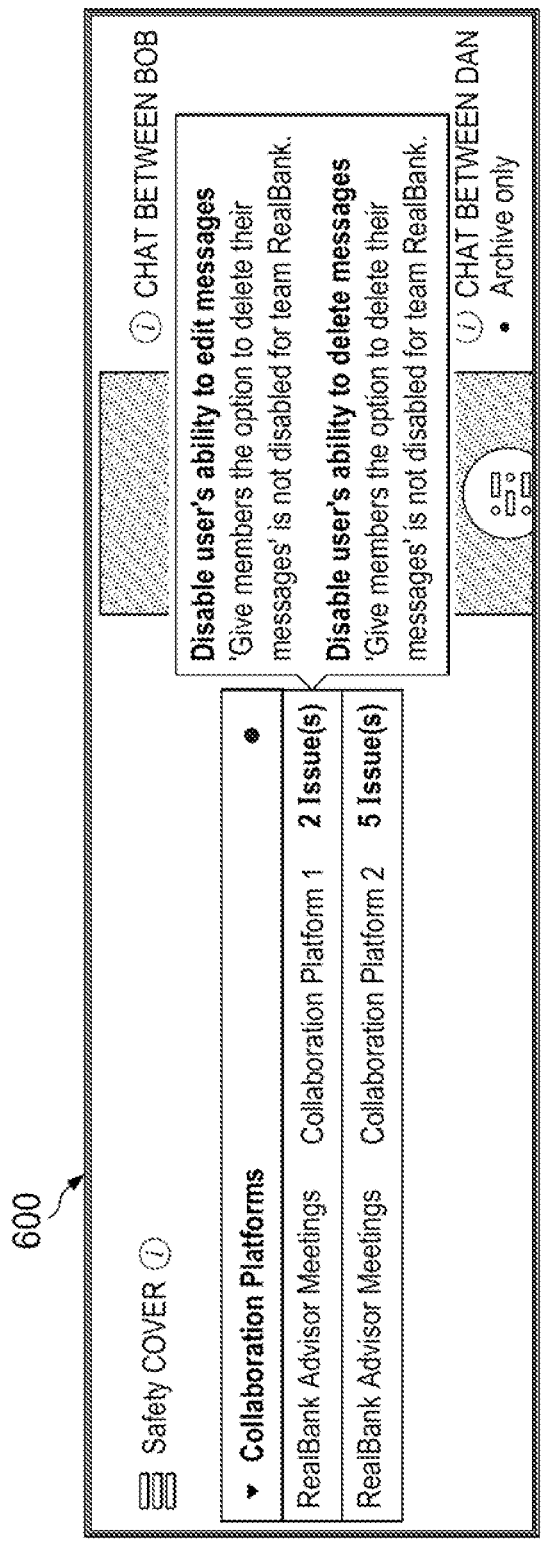
FIG. 6 illustrates one embodiment of a report generated in a user interface that indicates, for a given collaboration setting policy.

According to one embodiment, the data security platform provides a simple aggregated and high-level view of potential policy issues. FIG. 6, for example, illustrates one embodiment of a report 600 generated in a user interface that indicates, for a given collaboration setting policy (e.g., Realbank Advisor Meetings), an indication of the collaboration platforms used by the entity RealBank which have settings for RealBank that are not compliant with the policy. In this example, Realbank Advisor Meetings is the policy name for a collaboration setting policy associated with RealBank, which is monitoring two collaboration platforms "Collaboration Platform 1" and "Collaboration Platform 2." In this example, monitoring has revealed that collaboration platform specific collaboration settings corresponding to setting "disable user's ability to edit messages" are out of policy. The collaboration platform specific collaboration configuration is non-compliant because the state of the collaboration platform specific collaboration setting "Give members the option to delete their message" is not disabled for the group RealBank (e.g., see, collaboration setting state 404*a*). A user can then drill into the policy to examine the issues and also verify the settings.

The interface of FIG. 6 is provided by way of example and information based on monitoring may be surfaced through a variety of other interfaces. Returning briefly to FIG. 2, at any given time, the status of each setting can be displayed, highlighting if the corresponding setting on the platforms matches the policy or is out of policy, or if monitoring on a specific setting is disabled, or if the specific collaboration setting is marked as informational only. For example, indicator 220 indicates that at least one collaboration setting at a collaboration platform does not comply with common collaboration setting 202 being in an enabled state. In this example, the urgency of the indicator "Fix" may be based on the severity level "Risk," whereas other indicators of out of policy settings, such as indicator 224, may display as less urgent.

Figure 7:
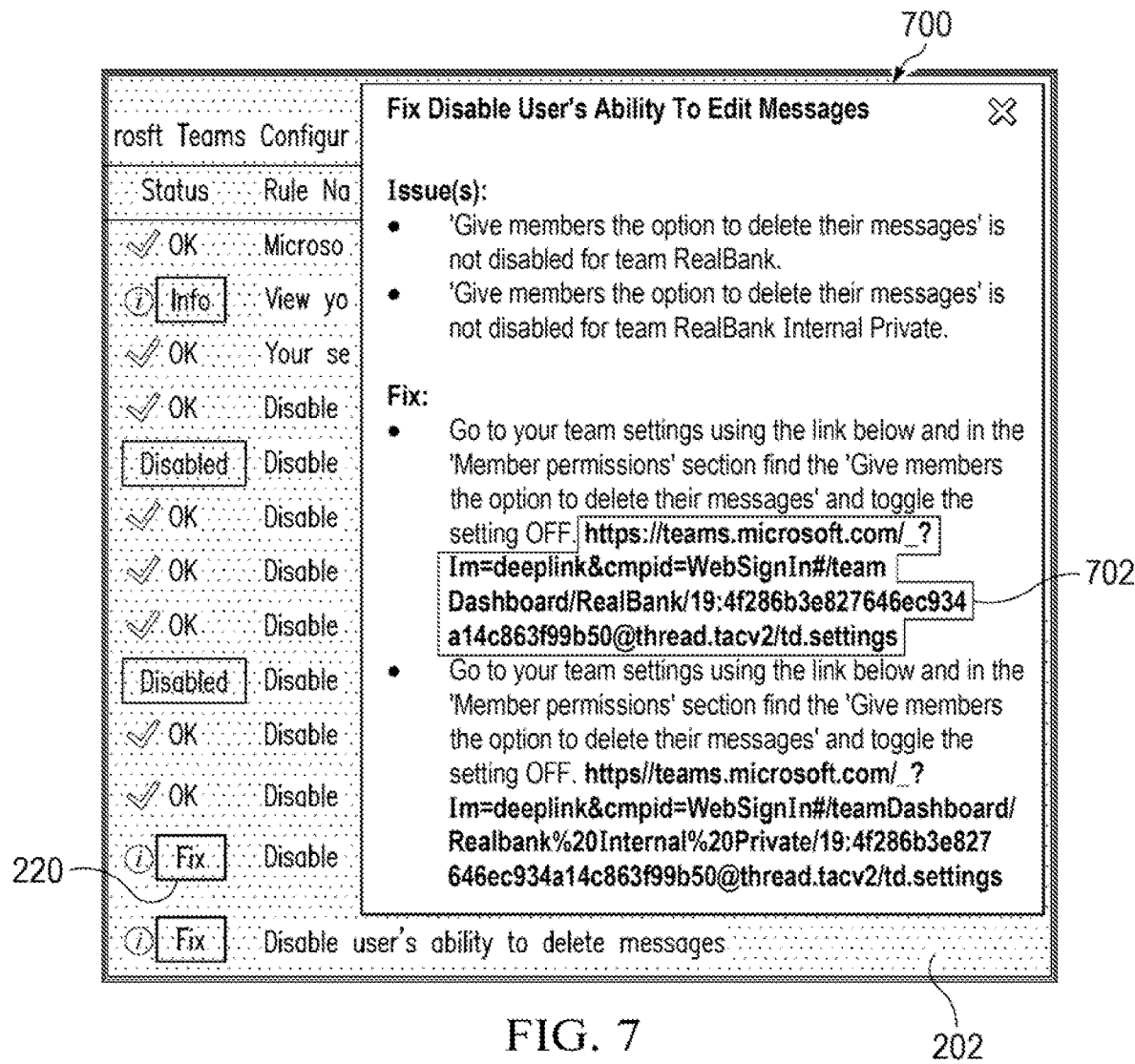
FIG. 7 illustrates one embodiment of a user interface for taking remedial action with respect to a collaboration setting.
Figure 8:
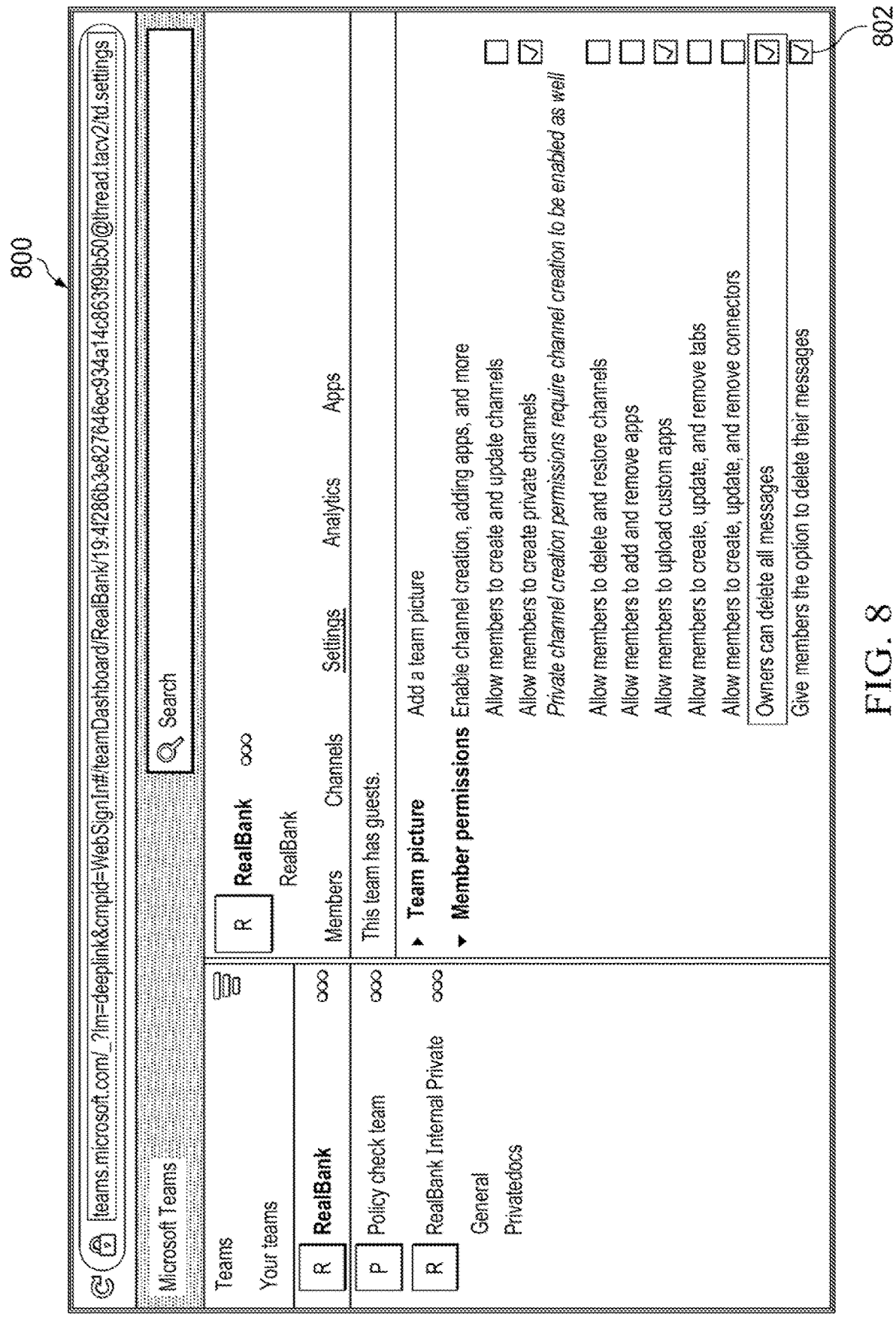
FIG. 8 illustrates one embodiment of a page with controls to change a collaboration setting.

According to one embodiment, the user may click on the "Fix" indicator and be presented with instructions on how to fix corresponding platform specific collaboration settings that are out of policy. Turning to FIG. 7, by clicking on indicator 220 the user is presented with a popup 700 or other interface containing links that link directly to the controls to configure the appropriate platform specific collaboration settings that map to common collaboration setting 202 according, for example, to the mapping of FIG. 3A. Here, the pop up contains link 702, generated using, for example, link information (e.g., link information 310 of FIG. 3A). By clicking on link 702, the user can navigate directly to the application page of the online collaboration platform that contains the control for changing the state of the corresponding platform specific collaboration setting for the issue described in 220, thus allowing the user to easily remediate the security issue. For example, link 702 can be used to navigate directly to page 800 of FIG. 8. Page 800 includes control 802—for the platform specific collaboration setting of "Give members the option to delete their messages"—which can be updated to "disabled," thereby bringing the setting in compliance with the state of common collaboration setting 202 of FIG. 2.

In an alternative embodiment, the user clicking on "Fix" or other indicator of non-compliance or through other input, may trigger the data security platform 102 to automatically change the state of the platform specific collaboration setting via the appropriate API or other interface. In yet other embodiments, the data security platform 102 may automatically change the state of a platform specific collaboration setting based on detecting that the platform specific collaboration setting does not comply with the collaboration setting policy. The data security platform 102 can provide warnings about settings that change and revert changes that go against policy.

Figure 9:
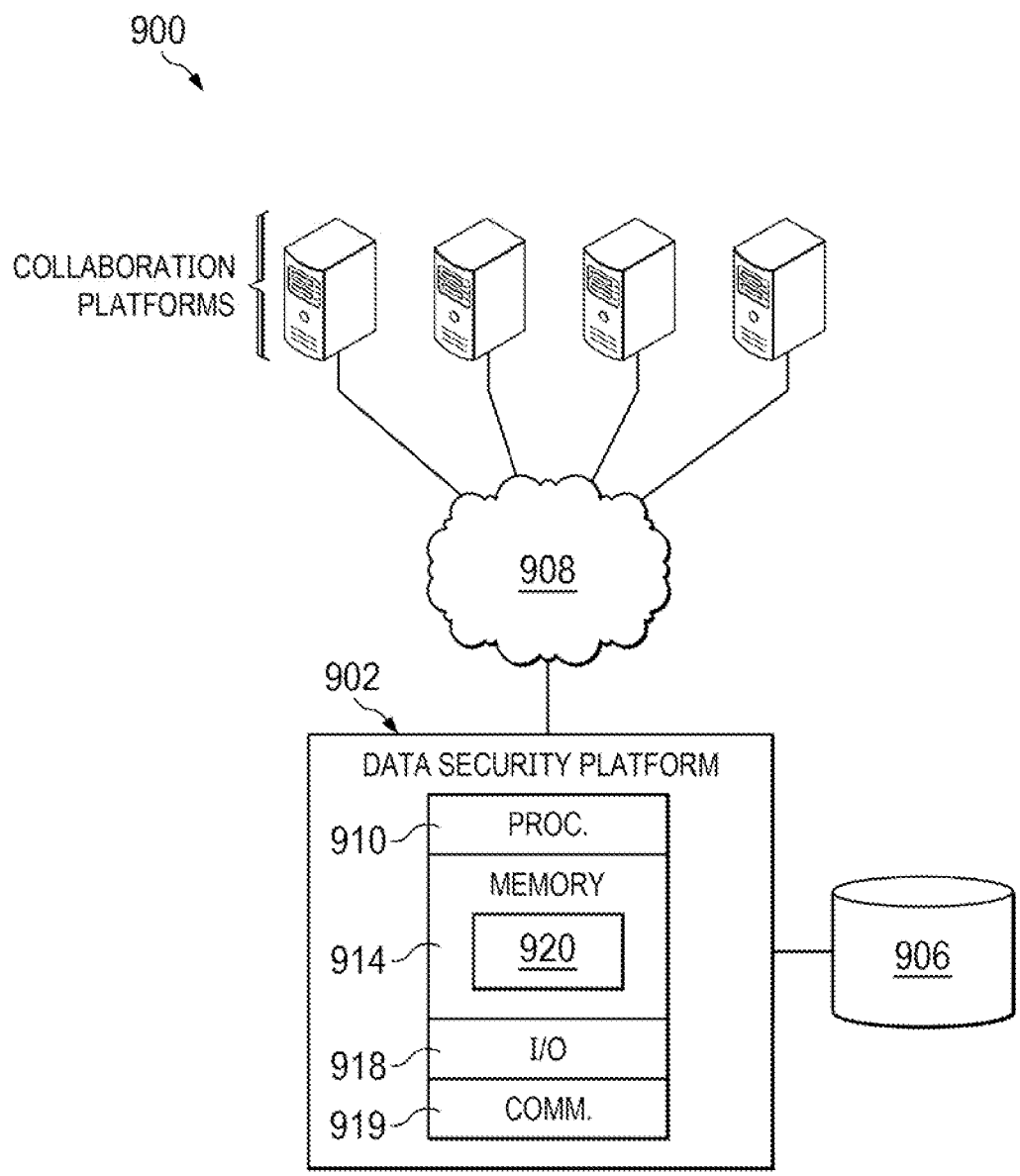
FIG. 9 is a diagrammatic representation of one embodiment of a network environment.

FIG. 9 is a diagrammatic representation of one embodiment of a system for monitoring and enforcing security controls across heterogeneous collaboration platforms. The system for system for monitoring and enforcing collaboration platform controls across heterogeneous collaboration platforms may comprise one or more computer systems with central processing units executing instructions embodied on one or more computer-readable media where the instructions are configured to perform at least some of the functionality associated with embodiments of the present invention. In the illustrated embodiment, system 900 includes a computer system 902 having a computer processor 910 and associated memory 914. Computer processor 910 may be an integrated circuit for processing instructions. For example, computer processor 910 may comprise one or more cores or microcores of a processor. Memory 914 may include volatile memory, non-volatile memory, semi-volatile memory or a combination thereof. Memory 914, for example, may include RAM, ROM, flash memory, a hard disk drive, a solid-state drive, an optical storage medium (e.g., CD-ROM), or other computer-readable memory or combination thereof. Memory 914 may implement a storage hierarchy that includes cache memory, primary memory or secondary memory. In some embodiments, memory 914 may include storage space on a data storage array. Computer system 902 may also include input/output ("I/O") devices 918, such as a keyboard, monitor, printer, electronic pointing device (e.g., mouse, trackball, stylus, etc.), or the like. Computer system 902 may also include a communication interface 919, such as a network interface card, to interface with network 908, which may be a local LAN, a WAN such as the Internet, mobile network, or other type of network or combination thereof. Network 908 may represent a combination of wired and wireless networks that may be utilized for various types of network communications.

Memory 914 may store instructions executable by computer processor 910. For example, memory 914 may include code executable to provide an interface, such as an API or other interface to interface with heterogeneous online collaboration systems. According to one embodiment, memory 914 may include code 920 executable to provide a data security platform, such as data security platform 102. Data store 906, which may be part of or separate from memory 914, may comprise one or more database systems, file store systems, or other systems to store various data used by computer system 902.

Each of the computers in FIG. 9 may have more than one CPU, ROM, RAM, HD, I/O, or other hardware components. Portions of the methods described herein may be implemented in suitable software code that may reside within memory 914 or other computer-readable memory.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways to implement the invention.

It is also within the spirit and scope of the invention to implement in software programming or code the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only, but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A data security method comprising:
   storing in a computer memory a collaboration setting policy comprising a collaboration setting configuration for a set of common collaboration settings;
   interfacing, by a data security computer system, with a plurality of heterogeneous online collaboration platforms, each heterogeneous online collaboration platform from the plurality of heterogeneous online collaboration platforms having a platform specific set of collaboration settings;

mapping, by the data security computer system, the set of common collaboration settings to the platform specific set of collaboration settings of each heterogeneous online collaboration platform from the plurality of heterogeneous online collaboration platforms;

monitoring, by the data security computer system, a state of the platform specific set of collaboration settings of each heterogeneous online collaboration platform;

based on the monitoring, determining, by the data security computer system that a first platform specific collaboration setting that maps to a first common collaboration setting does not comply with the collaboration setting policy;

storing, by the data security computer system, an indication that the first platform specific collaboration setting does not comply with the collaboration setting policy;

automatically generating, by the data security computer system, a link to an application page of a first online collaboration platform from the plurality of heterogeneous online collaboration platforms, the application page including a control to change a state of the first platform specific collaboration setting; and generating, by the data security computer system, a user interface containing the link to allow a user to navigate directly to the application page that includes the control.

2. The data security method of claim 1, further comprising the data security computer system generating an aggregated view of potential policy issues with respect to the collaboration setting policy, the aggregated view aggregating potential policy issues across the plurality of heterogeneous online collaboration platforms.

3. The data security method of claim 1, further comprising the data security computer system providing a user interface indicating a status of each of the common collaboration settings from the set of common collaboration settings, the status for each common collaboration setting indicating whether mapped settings on the plurality of heterogeneous online collaboration platforms match the collaboration setting policy.

4. The data security method of claim 1, further comprising the data security computer system providing, wherein each of the common collaboration settings from the set of common collaboration settings has an associated severity level.

5. The data security method of claim 1, further comprising the data security computer system providing a unified user interface with a set of controls to allow the user to configure the collaboration setting policy.

6. The data security method of claim 1, wherein the set of common collaboration settings comprises at least one of: a setting to enable waiting rooms, a setting to require meeting passwords, a setting to enable encryption, a setting to integrate an application, a setting to prohibit content deletion, or a setting to enable an end-user control.

7. The data security method of claim 1, further comprising the data security computer system automatically propagating a change to the collaboration setting configuration to the plurality of heterogeneous online collaboration platforms.

8. A computer program product comprising a non-transitory, computer-readable storage medium storing a set of instructions executable by a processor, the set of instructions comprising instructions for:

storing in a computer memory a collaboration setting policy comprising a collaboration setting configuration for a set of common collaboration settings;

interfacing with a plurality of heterogeneous online collaboration platforms, each heterogeneous online collaboration platform from the plurality of heterogeneous online collaboration platforms having a platform specific set of collaboration settings;

mapping the set of common collaboration settings to the platform specific set of collaboration settings of each heterogeneous online collaboration platform from the plurality of heterogeneous online collaboration platforms;

monitoring a state of the platform specific set of collaboration settings of each heterogeneous online collaboration platform;

based on the monitoring, determining whether a first platform specific collaboration setting that maps to a first common collaboration setting does not comply with the collaboration setting policy;

based on a determination that the first platform specific collaboration does not comply with the collaboration setting policy:

storing an indication that the first platform specific collaboration setting does not comply with the collaboration setting policy;

automatically generating a link to an application page of a first online collaboration platform from the plurality of heterogeneous online collaboration platforms, the application page including a control to change a state of the first platform specific collaboration setting; and generating a user interface containing the link to allow a user to navigate directly to the application page that includes the control.

9. The computer program product of claim 8, wherein the set of instructions further comprises instructions for:

based on the monitoring, generating an aggregated view of potential policy issues with respect to the collaboration setting policy, the aggregated view aggregating potential policy issues across the plurality of heterogeneous online collaboration platforms.

10. The computer program product of claim 8, wherein the set of instructions further comprises instructions for:

providing a user interface indicating a status of each of the common collaboration settings from the set of common collaboration settings, the status for each common collaboration setting indicating whether mapped settings on the plurality of heterogeneous online collaboration platforms match the collaboration setting policy.

11. The computer program product of claim 8, wherein each of the common collaboration settings from the set of common collaboration settings has an associated severity level.

12. The computer program product of claim 8, further comprising:

a unified user interface with a set of controls to allow the user to configure the collaboration setting policy.

13. The computer program product of claim 8, wherein the set of common collaboration settings comprises at least one of: a setting to enable waiting rooms, a setting to require meeting passwords, a setting to enable encryption, a setting to integrate an application, a setting to prohibit content deletion, or a setting to enable an end-user control.

14. The computer program product of claim 8, wherein the set of instructions further comprises instructions for automatically propagating a change to the collaboration setting configuration to the plurality of heterogeneous online collaboration platforms.

15. A data security system comprising:
- a memory storing a collaboration setting policy comprising a collaboration setting configuration for a set of common collaboration settings;
- a processor;
- a non-transitory, computer-readable storage medium storing a set of instructions executable by the processor, the set of instructions comprising instructions for:
  - interfacing with a plurality of heterogeneous online collaboration platforms, each heterogeneous online collaboration platform from the plurality of heterogeneous online collaboration platforms having a platform specific set of collaboration settings;
  - mapping the set of common collaboration settings to the platform specific set of collaboration settings of each heterogeneous online collaboration platform from the plurality of heterogeneous online collaboration platforms;
  - monitoring a state of the platform specific set of collaboration settings of each heterogeneous online collaboration platform;
  - based on the monitoring, determining whether a first platform specific collaboration setting that maps to a first common collaboration setting complies with the collaboration setting policy;
  - based on a determining that the first platform specific collaboration setting does not comply with the collaboration setting policy:
    - storing an indication that the first platform specific collaboration setting does not comply with the collaboration setting policy;
    - automatically generating a link to an application page of a first online collaboration platform from the plurality of heterogeneous online collaboration platforms, the application page including a control to change a state of the first platform specific collaboration setting; and
    - generating a user interface containing the link to allow a user to navigate directly to the application page that includes the control.

16. The data security system of claim 15, wherein the set of instructions further comprises instructions for:
- based on the monitoring, generating an aggregated view of potential policy issues with respect to the collaboration setting policy, the aggregated view aggregating potential policy issues across the plurality of heterogeneous online collaboration platforms.

17. The data security system of claim 15, wherein the set of instructions further comprises instructions for:
- providing a user interface indicating a status of each of the common collaboration settings from the set of common collaboration settings, the status for each common collaboration setting indicating whether mapped settings on the plurality of heterogeneous online collaboration platforms match the collaboration setting policy.

18. The data security system of claim 15, wherein each of the common collaboration settings from the set of common collaboration settings has an associated severity level.

19. The data security system of claim 15, further comprising:
- a unified user interface with a set of controls to allow the user to configure the collaboration setting policy.

20. The data security system of claim 15, wherein the set of common collaboration settings comprises at least one of: a setting to enable waiting rooms, a setting to require meeting passwords, a setting to enable encryption, a setting to integrate an application, a setting to prohibit content deletion, or a setting to enable an end-user control.

21. The data security system of claim 15, wherein the set of instructions further comprises instructions for automatically propagating a change to the collaboration setting configuration to the plurality of heterogeneous online collaboration platforms.

* * * * *